United States Patent
Tamaki et al.

(10) Patent No.: US 6,764,427 B2
(45) Date of Patent: Jul. 20, 2004

(54) TOROIDAL TYPE CONTINUOUSLY VARIABLE TRANSMISSION

(75) Inventors: Shigenori Tamaki, Toyota (JP); Yasuji Taketsuna, Okazaki (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 10/182,630

(22) PCT Filed: Dec. 21, 2001

(86) PCT No.: PCT/JP01/11259

§ 371 (c)(1),
(2), (4) Date: Aug. 10, 2002

(87) PCT Pub. No.: WO02/053946

PCT Pub. Date: Jul. 11, 2002

(65) Prior Publication Data

US 2003/0114268 A1 Jun. 19, 2003

(51) Int. Cl.$^7$ ............................................. F16H 15/38
(52) U.S. Cl. .................................... 476/40; 476/42
(58) Field of Search ........................ 476/40, 42, 46

(56) References Cited

U.S. PATENT DOCUMENTS 5,303,796 A * 4/1994 Tanaka et al. ............. 180/233
5,683,324 A * 11/1997 Inoue et al. ................. 475/216
5,807,203 A * 9/1998 Imanishi et al. .............. 476/42

FOREIGN PATENT DOCUMENTS

| JP | A 4-39444 | | 2/1992 |
|---|---|---|---|
| JP | A 5-276719 | | 10/1993 |
| JP | A 6-174034 | | 6/1994 |
| JP | 8-159229 | * | 6/1996 |
| JP | A 8-233054 | | 9/1996 |
| JP | A 2000-161452 | | 6/2000 |
| JP | 2001-355698 | | 12/2001 |
| JP | 2002-195369 | | 7/2002 |
| JP | 2002-206609 A | * | 7/2002 |

* cited by examiner

Primary Examiner—William C. Joyce
(74) Attorney, Agent, or Firm—Oliff & Berridge, PLC

(57) ABSTRACT

A toroidal type continuously variable transmission, in which there are provided a plurality of sets of speed change units each having rollers sandwiched between the opposed faces of input discs and output discs and in which the individual input discs are coupled to an input shaft whereas the individual output discs are coupled to an output shaft. The individual input discs or the individual output discs are held rotatably relative to each other, and the individual input discs are coupled in a torque transmitting manner to the input shaft through individual chains.

3 Claims, 1 Drawing Sheet

TOROIDAL TYPE CONTINUOUSLY VARIABLE TRANSMISSION

TECHNICAL FIELD

This invention relates to a toroidal type continuously variable transmission which is enabled, by clamping rolling members between input rotary members and output rotary members opposed to each other, to transmit a torque between the individual rotary members through the rolling members and which is enabled to vary the gear ratio continuously by inclining the rolling members to vary the radii of the torque transmitting positions of the rolling members relative to the individual rotary members and, more particularly, to a toroidal type continuously variable transmission including a plurality of sets of speed change units composed of the aforementioned individual rotary members and rolling members.

BACKGROUND ART

The transmission of the torque in the toroidal type continuously variable transmission of this kind occurs at contact portions through an oil film among an input disc corresponding to the input rotary member, an output disc corresponding to the output rotary member and disc-shaped power rollers clamped between those input and output discs and corresponding to rolling members. If the contact pressure between the discs and the power rollers is raised within a range of no breakage of the oil film, the torque to be transmitted increases. If the contact pressure between the discs and the power rollers is raised, however, the torque transmission efficiency drops, and a disadvantage is involved in the durability of the continuously variable transmission.

In order to eliminate this inconvenience, there has been developed in the prior art the so-called "double cavity type toroidal continuously variable transmission", which uses a plurality of sets of toroidal speed change units arranged in parallel and each composed of input/output discs and power rollers sandwiched between those discs to suppress the torque of each toroidal speed change unit and to increase the torque capacity. The continuously variable transmission of this kind has a single input element such as an input shaft and a single output element such as an output shaft. It is, therefore, preferable that the gear ratios to be set at the individual toroidal speed change units (i.e., the individual cavities) are always equal. When the clamping forces for clamping the power rollers are to be varied by the individual discs or when the gear ratios are to be varied, however, the gear ratios in the individual cavities may be different to cause slips between the individual discs and the power rollers.

With the slips between the individual discs and the power rollers, the oil film can break to cause the direct contacts between the discs and the power rollers. In the inventions disclosed in Japanese Patent Laid-Opens Nos. 6-174034 and 8-233054, therefore, the construction is made to cause the differential rotations between the individual output discs and the output shaft. Specifically, the continuously variable transmission, as disclosed in those Laid-Opens, is the so-called "double cavity type toroidal type continuously variable transmission", in which the output discs are arranged, so to speak, in a "back-to-back relation", in which input discs are arranged across and opposed to those output discs with clamping those discs and in which the power rollers are individually sandwiched between the output discs and the input discs. In the former continuously variable transmission disclosed in Japanese Patent Laid-Open No. 6-174034, moreover, the individual output discs and the output shaft are coupled through a differential mechanism. In the latter continuously variable transmission disclosed in Japanese Patent Laid-Open No. 8-233054, on the other hand, the individual output discs and the output shaft are coupled through a viscous coupling (or a viscous clutch).

The differential mechanism, as disclosed in the aforementioned Japanese Patent Laid-Open No. 6-174034, is a double pinion type planetary gear mechanism or the mechanism in which a pair of side gears are held by a differential carrier and connected to the individual output discs and in which the differential carrier is connected to the output shaft. On the other hand, the viscous clutch, as disclosed in the Japanese Patent Laid-Open No. 8-233054, is a clutch in which a viscous fluid is confined between a plurality of input discs and output discs so that differential rotations occur between those discs to transmit the torque. This clutch is arranged on the common axis between the output discs in the continuously variable transmission.

In either of the continuously variable transmissions disclosed in the Laid-Opens, therefore, the differential gear mechanism or the viscous coupling is interposed between the output discs which are arranged in the so-called back-to-back relation. Therefore, the number of components to be arranged on the common axis is increased to enlarge the entire length. A disadvantage of worse mountability is caused when the continuously variable transmission is employed as the speed change device for a vehicle.

This invention has been conceived noting the aforementioned technical problem and has an object to provide a toroidal type continuously variable transmission which can shorten the entire length.

DISCLOSURE OF THE INVENTION

In order to achieve the aforementioned object, this invention is characterized by giving a function to absorbing a difference between individual cavities (or toroidal speed change units), to either a transmission mechanism for transmitting a motive power to a continuously variable transmission or a transmission mechanism for outputting the motive power from the continuously variable transmission. According to this invention, more specifically, there is provided a toroidal type continuously variable transmission, which has a plurality of sets of such speed change units of its power transmitting rolling members are interposed between the opposed faces of input rotary members and output rotary members as inclined to vary the torque transmitting portions to those faces and; in which the input rotary members at individual speed change units are coupled to a single input member whereas the individual output rotary members are coupled to a single output member. Said input rotary members or said output rotary members are held rotatably relative to each other, and the individual input rotary members are coupled in a torque transmitting manner to said input member through the individual wrapping transmission mechanisms, or the individual output rotary members are coupled in a torque transmitting manner to said output member through the individual wrapping transmission mechanisms.

The continuously variable transmission of this invention is provided with a plurality of sets of the so-called "speed change units" in which the rolling members are clamped between the input rotary member and the output rotary member, and the torque is inputted from the input member to the individual input rotary members and is outputted from the individual output rotary members to the output member. The input rotary members can rotate relative to each other, and the torque is transmitted to those input rotary members through the wrapping transmission mechanism. Alternatively, the output rotary members can rotate relative to each other, and the torque is transmitted from those output rotary members through the wrapping transmission mechanism. Between the input rotary members and the output rotary members, the rolling members transmit the torque, and the rolling members are inclined to vary the radii of the torque transmitting positions relative to the individual rotary members so that the gear ratio is continuously varied.

The gear ratios at the individual speed change units are basically set equal, but the gear ratios to be set at the individual speed change units may be transitory different. In this case, the input rotary members or the output rotary members can rotate relative to each other, and these relative rotations are allowed by the backlash or chattering in the wrapping transmission mechanism. Therefore, there is allowed the difference in the gear ratio and the speed due to the fact that the angles of inclination of the individual rolling members are transitory different. As a result, even if the gear ratios are transitory different at the individual speed change units, no slip occurs between the individual rotary members and the rolling members. Moreover, the input or output transmission mechanism acts as the mechanism for allowing the relative rotations, as described hereinbefore. Therefore, the number of components such as components arranged in series on the axial direction can be reduced to shorten the entire length of the continuously variable transmission.

BEST MODE FOR CARRYING OUT THE INVENTION

Figure 1:
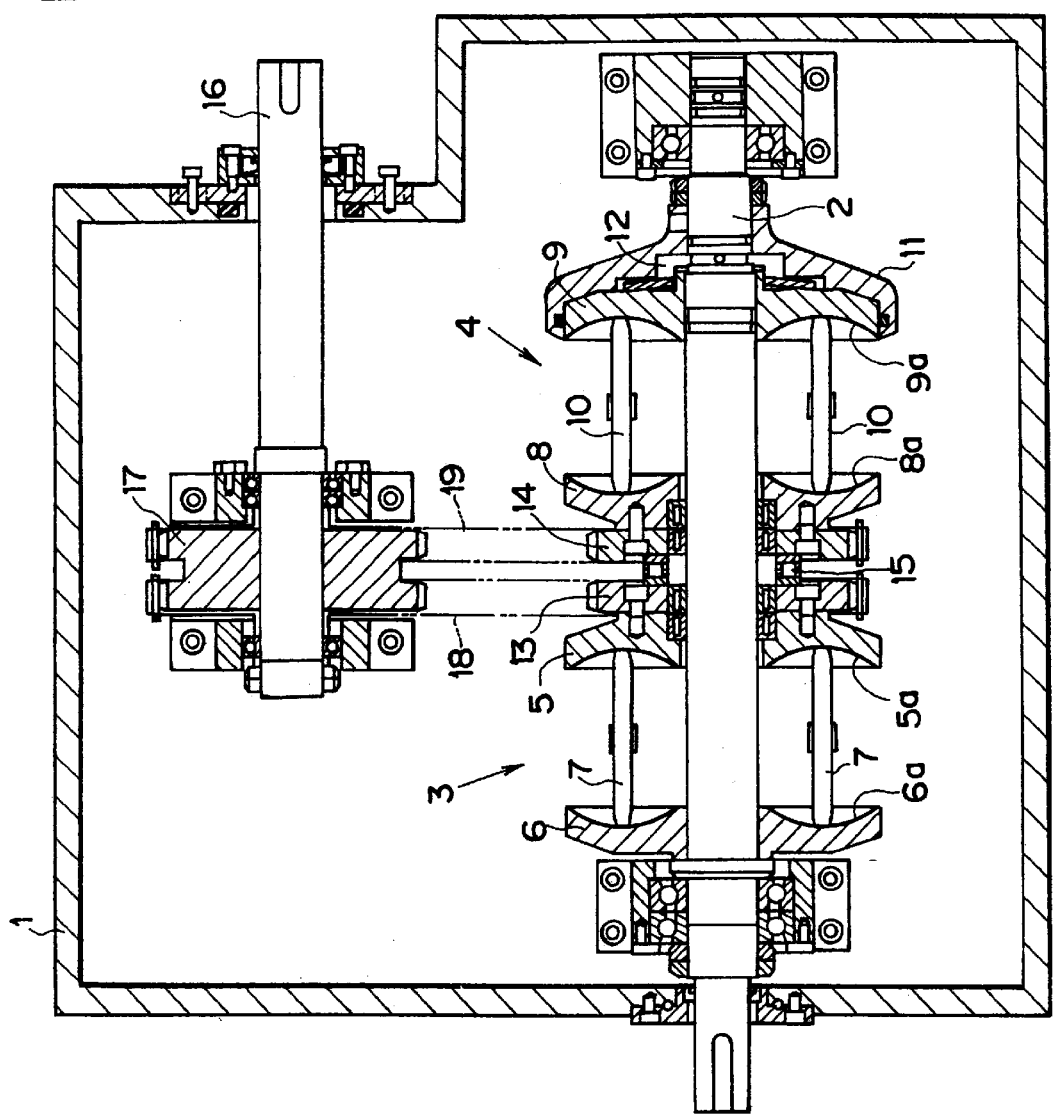
FIG. 1 is a sectional view showing one embodiment of a continuously variable transmission according to this invention.

Next, this invention will be described in connection with a specific embodiment with reference to the drawing. FIG. 1 shows one embodiment of a double cavity type full-toroidal continuously variable transmission according to this invention. In a housing 1, there is rotatably held an output shaft 2 which has one end portion protruded from the housing 1 to the outside. Around the output shaft 2, there are juxtaposed a pair of cavities (or speed change units) 3 and 4 to each other in the axial direction of the output shaft 2.

The speed change unit 3, as located on the lefthand side in FIG. 1, is constructed of: an output disc 6 corresponding to an output rotary member fixed on the output shaft 2; an input disc 5 corresponding to an input rotary member opposed to the output disc 6; and power rollers 7 corresponding to rolling members sandwiched between those discs 5 and 6. Like the discs of the toroidal continuously variable transmission of the prior art, the discs 5 and 6 are made such that the portions of their opposed faces on an outer circumference side from a predetermined radius are shaped, as cut in a plane on the center axis, to have a section of an arcuate plane (or a toroidal plane) of a predetermined radius, and the power rollers 7 are sandwiched between the rolling faces 5a and 6a forming that arcuate plane. Here, the input disc 5 engages with the output shaft 2 rotatably and movably in the axial direction.

Moreover, the aforementioned power rollers 7 are disc-shaped members, the outer circumference of which has a sectional shape formed into a curved face of a curvature equal to that of the arc of the rolling faces 5a and 6a. As the power rollers 7 are inclined with respect to the individual discs 5 and 6, therefore, the radial positions of the contact portions between the power rollers 7 and the discs 5 and 6 are arbitrarily changed. Three power rollers 7 are arranged equidistantly between the individual input disc 5 and the individual output disc 6.

Moreover, each power roller 7 is held rotatably and inclinably by the carriage (although not shown) acting as a holding member. This carriage has a lubricating oil passage formed for feeding the lubricating oil to the outer circumference of the power roller 7.

The speed change unit 4 on the righthand side of FIG. 1 is given a construction similar to that in which the aforementioned first speed change unit 3 is transversely reversed and assembled with the output shaft 2. Specifically, an input disc 8 having the same construction as that of the aforementioned input disc 5 is arranged, so to speak, in a back-to-back relation with the aforementioned input disc 5 and engages with the output shaft 2 rotatably and axially movably. An output disc 9 is arranged oppose to this input disc 8. The opposed faces of these discs 8 and 9 form rolling faces 8a and 9a of the toroidal shape, between which there are sandwiched power rollers 10 having the same construction as that of the aforementioned power rollers 7.

Here, the output disc 9 in this second speed change unit 4 engages integrally rotatably and axially movably with the output shaft 2 and is so housed in a holder 11 covering the back side (as located on the righthand side in FIG. 1) and the outer circumference thereof as to form an oil pressure chamber 12 between itself and the holder 11. This oil pressure chamber 12 is constructed to feed/drain the oil pressure through the oil passage (although not shown) formed in the output shaft 2.

To the opposed back faces of the input discs 5 and 8 arranged, so to speak, in the back-to-back relation, there are attached sprockets 13 and 14. Between these sprocket 13 and 14, moreover, there is a bearing (e.g., a thrust bearing) 15 interposed for allowing the individual input discs 5 and 8 to rotate relative to each other. As the oil pressure is fed to the aforementioned oil pressure chamber 12, therefore, the output disc 9 is axially thrust to adjust the clamping force of the power roller 10 in the second speed change unit 4 accordingly. At the same time, the input disc 5 of the first speed change unit 3 is axially thrust to adjust the clamping force of the power roller 7 in the first speed change unit 3.

In parallel with the aforementioned output shaft 2, there is arranged an input shaft 16 corresponding to an input member, which has its one end portion protruded to the outside of the housing 1. A sprocket 17 is attached to such a position of the input shaft 16 as corresponds to the outer circumferences of the aforementioned sprockets 13 and 14, that is, the axial position which is identical to that of the aforementioned sprockets 13 and 14. The sprocket 17 has two rows of teeth of identical specifications formed, as shown. Chains 18 and 19, as wrapped around the sprockets 13 and 14 attached to the input discs 5 and 8, are also individually wrapped around the sprocket 17 on the side of the input shaft 16. In other words, the individual input discs 5 and 8 are coupled, although rotatable relative to each other, to the input shaft 16 as the single input member by the chains 18 and 19 acting as the wrapping transmission mechanism. Moreover, the chains 18 and 19 themselves are made flexible, and a chattering or backlash exists between the sprockets 13 and 14 and the sprocket 17 so that the individual input discs 5 and 8 rotate relative to each other within the range of that flexibility, chatter or backlash.

Here will be described the actions of the aforementioned continuously variable transmission. When the input shaft 16 is coupled to and driven by a power source (although not shown) such as an engine, the sprocket 17 integrated with the input shaft 16 is rotated. This sprocket 17 constructs the wrapping transmission mechanism together with the sprockets 13 and 14 attached to the individual input discs 5 and 8 and the chains 18 and 19 wrapped around those sprockets. Therefore, the torque is transmitted from the input shaft 16 to the individual input discs 5 and 8.

Between these input discs 5 and 8 and the output discs 6 and 9 opposed to the former, respectively, there are clamped the power rollers 7 and 10, and these clamping forces are set to such levels as correspond to the torques to be transmitted, by the oil pressures fed to the aforementioned oil pressure chamber 12. As the individual input discs 5 and 8 rotate, therefore, the torques are transmitted through the oil films of their rolling faces 5a and 8a to the power rollers 7 and 10, from which the torques are transmitted to the individual output discs 6 and 9. In this case, the speeds of the power rollers 7 and 10 accord with the circumferential speeds of the contact points at the input discs 5 and 8 through the oil film to the input discs 5 and 8, and the speeds of the output discs 6 and 9 accord with the circumferential speeds at the points where the power rollers 7 and 10 contact. By inclining the power rollers 7 and 10 with respect to the center axis of the output shaft 2 to change the radii of the contact points with respect to the individual discs 5, 6, 8 and 9, therefore, the gear ratio, i.e., the ratio of the speeds between the input discs 5 and 8 and the output discs 6 and 9 is continuously varied.

The aforementioned continuously variable transmission adopts the double cavity mechanism so as to increase the torque transmission capacity in its entirety so that the gear ratios to be set by the left and right speed change units 3 and 4 are basically equal. Specifically, the individual output discs 6 and 9 are attached to the single output shaft 2 so that they naturally rotate at the common speed. In addition, the individual input discs 5 and 8 rotate at the common speed.

In the transient state from the start to the end of a speed change or in the transient state for varying the clamping forces of the power rollers 7 and 10, however, a slight difference may be caused between the gear ratios at the individual speed change units 3 and 4 by the fact that the actions of the power rollers 7 and 10 at the individual speed change units 3 and 4 are not completely synchronized. In this case, the output discs 6 and 9 in the aforementioned continuously variable transmission are so substantially integrated in the rotating direction with the single output shaft 2 to avoid generating relative rotations so that the torques act on the individual input discs 5 and 8 to cause their relative rotations.

Although the continuously variable transmission thus far described according to this invention has the single input shaft 16 as the input member, the transmission mechanism coupling the input shaft 16 and the individual input discs 5 and 8 is the chain transmission mechanism having the flexibility, the chattering or the backlash, and the individual input discs 5 and 8 contact with each other through the thrust bearing 15 so that they can rotate relative to each other. Therefore, the relative rotations of the individual input discs 5 and 8 are made by the torques which are caused by the difference between the transient gear ratios at the individual speed change units 3 and 4. As a result, the input discs 5 and 8 and the output discs 6 and 9 at the individual speed change units 3 and 4 rotate at the speeds corresponding to the gear ratios at the individual speed change units 3 and 4. Therefore, the slip (or slide) is not caused but suppressed between the power rollers 7 and 10.

In the continuously variable transmission shown in FIG. 1, on the other hand, the chain transmission mechanism for transmitting the torques to the input discs 5 and 8 act as the mechanism for allowing the individual input discs 5 and 8 to rotate relative to each other. This makes it unnecessary to separately provide the mechanism for transmitting the torque to the input discs 5 and 8 and the mechanism for allowing the relative rotations between the individual input discs 5 and 8. Therefore, it is possible to reduce the number of components thereby to reduce the size and the weight. Moreover, the number of parts to be arrayed on the same axis as that of the individual speed change units 3 and 4 can be reduced to shorten the entire length of the continuously variable transmission.

Here, this invention should not be limited to the specific embodiment thus far described, but the wrapping transmission mechanism can be exemplified not only by the aforementioned chain transmission mechanism but also a mechanism using a belt or a wire. In short, it is sufficient that the mechanism is enabled to establish a rotational phase difference by the flexibility, chattering or backlash. It is also sufficient for this invention that the discrepancy in the gear ratio between one cavity (or speed change unit) and another cavity (or speed change unit) can be absorbed either by the relative rotation between the input rotary members or by the relative rotation between the output rotary members. Contrary to the aforementioned specific embodiment, therefore, it is arbitrary to make the output discs rotatable relative to each other and to interpose the wrapping transmission mechanism between the output disc and the single output member such as the output shaft.

Moreover, the foregoing specific embodiment has been constructed by interposing the sprockets between the input discs. In this invention, however, the construction can be modified such that the wrapping transmission member such as the sprockets on the outer circumference sides of the input rotary members or the output rotary members. With this construction, the number of members to be arrayed in the axial direction can be further reduced to shorten the entire length. In this invention, still moreover, there may also be used another mechanism having a differential function, such as the differential device called the "Harmonic Drive (Trade Mark)". Moreover, this invention can be applied to not only the full-toroidal type continuously variable transmission but also the half-toroidal type continuously variable transmission.

Here will be synthetically described the advantages to be attained by this invention. According to this invention, as has been described hereinbefore, the input rotary members or the output rotary members can rotate relative to each other, and these relative rotations are allowed by the backlash or chattering in the wrapping transmission mechanism thereby to allow the transient difference in the gear ratio between the individual speed change units and the according difference in the speed. As a result, even if the gear ratios are transiently different at the individual speed change units, the slip between the individual rotary members and the rolling members can be prevented or suppressed. Moreover, the input or output transmission mechanism acts as the mechanism for allowing the relative rotations, as described hereinbefore. Therefore, the number of components such as components arranged in series on the axial direction can be reduced to shorten the entire length of the continuously variable transmission.

INDUSTRIAL APPLICABILITY

This invention can be utilized in the field for manufacturing the continuously variable transmission an din the field for using the continuously variable transmission. Especially, this invention can be utilized in the field relating to an automobile having the continuously variable transmission mounted thereon.

What is claimed is:

1. A toroidal continuously variable transmission, comprising:
    a plurality of sets of speed change units interposed between the opposed faces of input rotary members and output rotary members, wherein each speed change unit has power transmitting rolling members inclined to vary the torque transmitting portions to those faces and in which the input rotary members at individual speed change units are coupled to a single input member whereas the individual output rotary members are coupled to a single output member;
    a holding mechanism for holding said input rotary members or said output rotary members rotatably relative to each other; and
    a wrapping transmission mechanism for coupling said input member and the individual input rotary members individually in a torque transmitting manner or said output member and the individual output rotary members individually in a torque transmitting manner, wherein the said wrapping transmission mechanism includes:
    a first sprocket made rotatable to rotate integrally with any one of the input rotary members or the output rotary members;
    a second sprocket made rotatable to rotate integrally with the other of the input rotary members or the output rotary members;
    a first chain made to run on the first sprocket;
    a second chain made to run on the second sprocket; and
    a third sprocket wrapped by said first and second chains and made rotatable to rotate integrally with said input member or output member.

2. A toroidal continuously variable transmission as set forth in claim 1, wherein:
    said input member includes an input shaft;
    said output member includes an output shaft arranged in parallel with said input shaft;
    said individual input rotary members are rotatably mounted on said output shaft whereas said individual output rotary members are rotatably mounted integrally with said output shaft; and
    said wrapping transmission mechanism is arranged to transmit the torque between said input shaft and said input rotary members.

3. A toroidal continuously variable transmission as set forth in claim 1, wherein
    said individual rotary members are arranged adjacent to each other such that the faces on the other sides of the faces to clamp said rotary members are opposed to each other; and
    said first and second sprockets are arranged between said input rotary members.

* * * * *

UNITED STATES PATENT AND TRADEMARK OFFICE
CERTIFICATE OF CORRECTION

PATENT NO. : 6,764,427 B2  Page 1 of 1
DATED : July 20, 2004
INVENTOR(S) : Shigenori Tamaki et al.

It is certified that error appears in the above-identified patent and that said Letters Patent is hereby corrected as shown below:

<u>Title page,</u>
Item [86], change to:
-- [86]  PCT No.:      PCT/JP01/11259

§ 371 (c)(1),
(2), (4) Date:     Aug. 1, 2002 --
Insert Item -- [30]    Foreign Application Priority Data
          Dec. 28, 2000   (JP) ........................2000-402235 --

Signed and Sealed this

Eighth Day of February, 2005

JON W. DUDAS
*Director of the United States Patent and Trademark Office*